United States Patent [19]
Staudt et al.

[11] 3,952,220
[45] Apr. 20, 1976

[54] RPM MEASURING APPARATUS
[75] Inventors: Heinrich Staudt, Markgroningen, Germany; Georges Nelh, Antony, France
[73] Assignee: Robert Bosch GmbH, Stuttgart, Germany
[22] Filed: Mar. 5, 1974
[21] Appl. No.: 448,201

[30] Foreign Application Priority Data
Mar. 14, 1973  Germany............................ 2312547

[52] U.S. Cl............................... 310/168; 310/74; 310/75 R; 310/79
[51] Int. Cl.² ........................................ H02K 21/38
[58] Field of Search ............... 310/78, 75, 750, 111, 310/168, 169, 69

[56] References Cited
UNITED STATES PATENTS
1,955,309  4/1934  Packer................................... 310/78
1,974,871  9/1934  Lansing............................. 310/75 D
3,401,287  9/1968  French et al........................ 310/168
3,746,902  7/1973  Hetzel................................. 310/67
3,819,966  6/1974  Noguchi............................... 310/78

Primary Examiner—Donovan F. Duggan
Attorney, Agent, or Firm—Edwin E. Greigg

[57] ABSTRACT

A rpm measuring apparatus includes a rpm signal generator having a magnetic circuit composed of a toothed disc, driven by a drive shaft, and a yoke carrying an induction coil. At least one portion of the yoke opposite the toothed disc is also provided with teeth. At least one damper having a rpm-dependent damping characteristic is operatively associated with the drive shaft and disposed on the toothed disc.

15 Claims, 6 Drawing Figures

3,952,220

RPM MEASURING APPARATUS

BACKGROUND OF THE INVENTION

This invention concerns a rpm measuring apparatus having a magnetic circuit. The invention involves, more particularly, a rpm measuring apparatus having a magnetic circuit composed of a toothed disc driven by a drive shaft, a yoke carrying an induction coil, at least one portion of the yoke opposite the toothed disc being toothed in the same manner as the toothed disc.

It is known to detect the rpm of a rotating member by using a magnetic circuit of the above-described kind where the rpm-dependent magnetic flux change of the toothed wheel moving past the toothed portion of the yoke produces voltage changes having an rpm-dependent repetition rate or frequency which are used as the output signal for an electronic regulating device. This known apparatus also serves especially for the rpm-dependent regulation of injection pumps, especially fuel injection pumps. In this instance, the toothed wheel is located on the drive shaft of the injection pump and is rigidly connected therewith. The arrangement undesirably has the disadvantage that all rotational oscillations (vibrations) of the drive shaft contribute to the sensed rpm measurement as determined by the measuring apparatus and, therefore, undesirably influence the regulation. This is a special disadvantage at low rpm, for example, at idle speed, because the result is that large changes of the injection quantity corresponding to the rotational oscillations take place, and oscillations of the mechanism for changing the injection quantity of an injection pump may take place; for example, oscillations of the regulating rod of a series-type injection pump may take place.

SUMMARY OF THE INVENTION

It is an object of the present invention to provide a rpm measuring apparatus in which the above disadvantages are avoided, i.e. in which the transmission of rotational oscillations from the drive shaft to the sensing unit is damped at low rpm, whereas at high rpm, to ensure the rapid transmission of a rpm change signal, the damping is only very small or is entirely switched out.

It is another object of the present invention to provide a rpm measuring apparatus in which rotational oscillations of its associate drive shaft are damped.

It is a further object of the present invention to provide a rpm measuring apparatus in which rotational oscillations of its associated drive shaft are damped in a rpm-dependent manner.

It is an additional object of the present invention to provide a rpm measuring apparatus in which rotational oscillations at low, idle speed are effectively damped.

It is still another object of the present invention to provide a rpm measuring apparatus in which damping techniques are used to damp rotational oscillations, especially at low rpm, so as to develop an accurate representation of shaft speed, which representation may be used as a signal for controlling a fuel injection pump or the like.

The foregoing objects, as well as others which are to become clear from the text below, are achieved according to the present invention in an rpm measuring apparatus having a rpm signal generator driven by a drive shaft. The rpm signal generator is disposed on a rotational oscillation damper driven by the drive shaft, the damper having a rpm-dependent damping characteristic.

The rpm signal generator is disposed on the rotational oscillation damper. The damper is driven by the drive shaft and has a rpm-dependent damping characteristic.

A further preferred embodiment of the invention is characterized in that the rpm signal generator is a toothed disc which forms part of a magnetic circuit, in known per se fashion, together with a locally fixed yoke carrying an induction coil, a portion of the yoke lying opposite the toothed disc is toothed in the same manner as the toothed disc.

Furthermore, an advantageous embodiment of the invention is characterized in that the rpm signal generator is disposed on a secondary damped part of the rpm oscillation damper, this secondary part being fixed rotatably on the drive shaft and connected with the drive shaft by a drag spring for the transmission of drive shaft rotation. It has a frictional coupling to the drive shaft or with a part of the drive coupling in rigid connection with the drive shaft in the direction of rotation. The value of the friction is determined by at least one spring and is changeable for increasing rpm by centrifugal weights which can swing apart against the force of the same spring. In this manner, a damped rpm-dependent transmission of the drive shaft rotation to the rpm signal generator is achieved.

Another advantageous embodiment of the invention is characterized in that the secondary member is coupled to a motion-sharing member fixedly connected to the drive shaft and, through the intermediate action of a motion-transfer spring embodied as a rotary spring where the amount of the rotation of the secondary member on the drive shaft is determined firstly by the length of a clearance of the motion-sharing member, and secondly by a limiting pin fixedly connected to the secondary member and protruding into this clearance. This embodiment of the invention further features two centrifugal weights disposed symmetrically, with respect to the drive shaft, on the secondary member. Each of the weights is rotatable about a respective fixed axis, and in their rotational plane. The weights are acted upon by the force of at least one spring in the direction of the drive shaft and which, in the position in which they are not swiveled out by the centrifugal force, they experience frictional contact between the secondary member and the drive shaft.

This has the advantage that because of the motion-transfer spring, embodied as a rotational spring, only damped rotational vibrations are transmitted to the rpm signal generator and, at low rpm, a supplemetary damping is achieved by friction in that the centrifugal weights connected to the secondary member are pressed against the drive shaft by the force of a spring. As the rpm increases, the centrifugal force acting against the force of the spring reduces the friction and consequently, also reduces the damping and, beginning at an adjustable rpm, the frictional damping due to the centrifugal weights can be entirely eliminated.

Thus, it is possible to obtain advantageously high damping of the rotational oscillations at low rpm and a sharply diminished damping at high rpm, which depends only on the bearing friction between the drive shaft and the secondary member and the damping effect of the motion-transfer spring. By suitable choice of the motion-transfer spring, the desired residual damping can be determined and natural oscillations can be avoided.

Another advantageous embodiment of the invention is characterized in that the secondary member is coupled by a motion-transfer spring embodied as a rotational spring with a cap-shaped motion-sharing member rigidly connected to the drive shaft with the aid of a bearing hub. Two centrifugal weights are disposed in point symmetry with respect to the drive shaft, each of which is rotatable about a fixed axis and which lie in the rotational plane of the secondary member. The weights are acted upon by the force of at least one spring in the direction of the drive shaft and which, in the position of excursion due to the centrifugal force, experience frictional contact with the inner surface of the motion-sharing member. This has the advantage that, when the rotational spring is relatively soft and the rpm is low, a high damping effect is achieved, whereas, when the rpm rises, the centrifugal weights come in contact with the motion-sharing member and, consequently produce a frictional coupling between the toothed disc and the drive shaft.

At high rpm, firm adherence of the centrifugal weights at the motion-sharing member results. Damping is consequently eliminated and a rigid connection is produced. In this way, a variation of rpm of the drive shaft is picked-up as quickly as possible by the rpm signal generator in the desired manner and is transmitted to the regulating system.

In an advantageous fashion the above-described apparatus is embodied so that the secondary member, just as the motion-sharing member is embodied as a bowl-shaped member with a collar extending over the motion-sharing member in the radial direction and supporting the rpm signal generator and having a bearing hub which rests on the hub of the motion-sharing member and, together with it, forms a radial sliding bearing. The cover or wall of the bowl-shaped member has voids for the protrusion of the swiveled-apart centrifugal weights toward the inner wall surface of the motion-sharing member. This embodiment achieves, in advantageous fashion, a compact shape of the rpm measuring apparatus.

A further advantageous embodiment of the rpm measuring apparatus according to the invention is characterized in that the motion-sharing member has lateral pockets for supplementary take-along motion of centrifugal weight balls. This embodiment has a bearing hub on which a bowl-shaped member surrounding the balls is mounted so as to share the rotational motion, but being slidable in the axial direction, where this bowl-shaped member has a bottom inclined obliquely toward the inside with a hub-shaped guide member. The face of the bowl-shaped member is pressed against the face of the secondary member for the formation of a frictional coupling by a spring supported on a flange on the circumference of the bowl-shaped member and tensioned by a disc screwed onto the drive shaft at the front end, whenever the balls are not swiveled apart. When the balls are swiveled apart, by the effect of centrifugal force and against the force of the spring, then the front end of the bowl-shaped member is lifted from the face end of the secondary member.

This embodiment achieves advantageouly a compact constructional form. The pairing of the face of the secondary member with the face of the bowl-shaped member for the production of a frictional coupling achieves a large force-transmitting surface in an advantageous manner.

DESCRIPTION OF THE PREFERRED EMBODIMENTS

Figure 1:
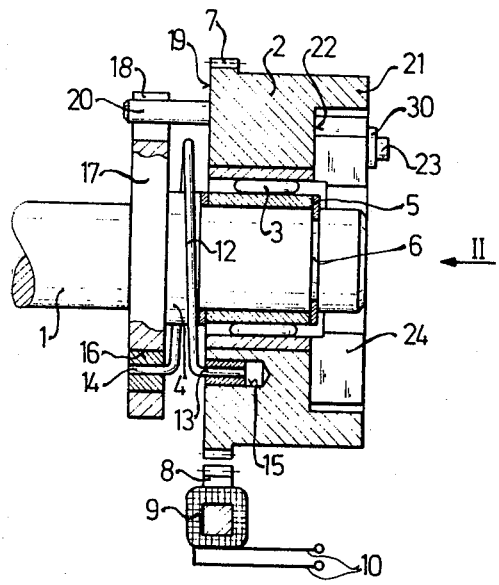
FIG. 1 is a pictorial side view, partly in section, of a rpm measuring apparatus according to a first exemplary embodiment having centrifugal weights which, at low rpm, undergo frictional contact by directly touching the drive shaft of the apparatus.
Figure 2:
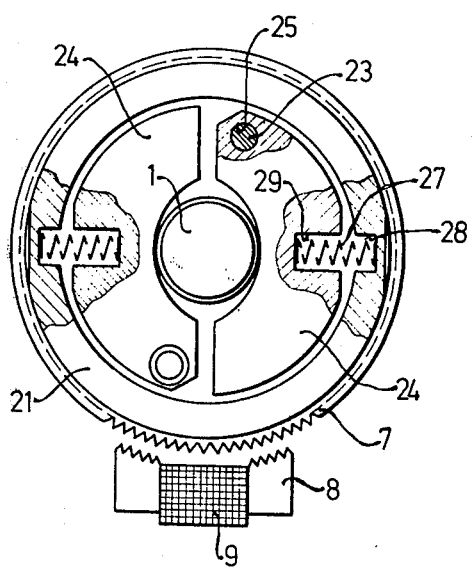
FIG. 2 is a top view, partly in section, of the exemplary embodiment illustrated in FIG. 1, the view being in the direction of the arrow II.

As shown in FIGS. 1 and 2, a rpm measuring apparatus, according to a first embodiment of the present invention includes a secondary member 2 driven by a drive shaft 1 and connected thereto by a needle bearing 3. A portion of the outer circumference of the secondary member 2 is equipped with a set of teeth 7. A magnetic yoke 8 is positioned at a small distance from the teeth 7. The yoke 8 carries an induction coil 9. The yoke is disposed with a face thereof lying opposite the teeth 7, this face also being equipped with teeth. The induction coil 9 is connected through conductors 10 with a pump regulator (not shown). The secondary member 2, together with the teeth 7 and the yoke 8, forms a magnetic circuit whose magnetic flux varies pulsatingly as the teeth 7 pass the yoke 8, in dependence on the rpm of the drive shaft 1. Consequently, the varying magnetic field induces a rpm-dependent variable frequency (repetition rate) signal which is coupled from the induction coil 9 to the regulator. The secondary member 2, which is provided with the circumferentially disposed teeth 7, constitutes an rpm signal generator. This member is to be designated hereinafter as a tooth disc. An inner ring of the needle bearing 3 is secured, in the axial direction, on one end by a shoulder 4 on the drive shaft 1 and on the other end by a safety ring 5 lying in an annular groove 6 of the drive shaft 1. The drive shaft 1 can advantageously be, at the same time, the drive shaft of the corresponding fuel injection pump or the like. The rpm apparatus, however, does not necessarily have to be located at the end of the drive shaft, as shown in FIG. 1.

The transmission of the rotation from the drive shaft 1 to the toothed disc 2 occurs through the action of a motion-transfer (drag) spring 12 whose two bent ends 13 and 14 are placed respectively in a coaxial blind bore 15 in one face 19 of the toothed disc 2 and in a similar bore 16 having the same distance from the axis in a disc-shaped motion-sharing member 17 extending radially from the drive shaft 1. The motion-sharing member 17 can, naturally, be a disc pressed onto the drive shaft 1 or be integral with the drive shaft 1. The motion-sharing member 17 has a groove-shaped void 18 in the vicinity of its outer circumference into which extends a limiting pin 20 fixedly inserted in the face 19 of the toothed disc 2. The relative rotation of the toothed disc 2 with respect to the drive shaft 1, which is possible because of the elasticity of the motion-transfer (drag) spring 12, is limited by the length of the groove-shaped void 18 at the end of which the limit pin 20 comes to a stop. The other face 22 of the toothed disc 2 has a collar 21 as an extension of its outer wall. Enveloped by the collar 21 in the radial direction are two semi-annular centrifugal weights 24, disposed on the face 22. The weights 24 each have a bore 25 disposed at its respective outer end. The bores 25 are point-symmetrically opposite and are respectively, arcuately movable about respective bolts 23 fixedly inserted in the face 22 and penetrating the bores 25. The two centrifugal weights 24 are biased in the direction of the drive shaft, each by a pressure spring 27 (FIG. 2), the pressure springs 27 are located in two mutually opposite grooves 28 in the collar 21 and grooves 29 (FIG. 2) in the weights 24. Whenever the rpm is low, the toothed wheel 2 is taken along by the rotating motion-transfer spring 12. In that case, the rotational oscillations or vibrations derived from the drive shaft 1 or from non-uniformities in the drive of the engine are damped principally by the frictional forces occurring between the centrifugal weights 24 and the drive shaft 1. This is the case because at low rpm the centrifugal force is not sufficient to move the centrifugal weights 24 apart against the force of the springs 27 and, therefore, it cannot reduce or nullify the contact pressure of the centrifugal weights 24 on the drive shaft 1. The damping torque produced by the frictional forces is transmitted from the centrifugal weights 24 to the toothed disc 2 by the bolts 23. As the rpm rises, the contact pressure of the centrifugal weights 24 with the drive shaft 1 decreases until such time as an rpm, determined by the mass of the centrifugal weights 24 and the force of the springs 27, is reached, after which the centrifugal weights 24 are lifted free from contact with the drive shaft 1 and the damping produced by them becomes zero.

In place of the pressure springs 27 used in the exemplary embodiment of FIGS. 1 and 2, it is of course possible to provide a tension spring in the form of a leaf spring 53 (FIG. 4) or a spiral spring 53' (FIG. 5) which would be disposed diametrically tensioned between the two other pivotable ends of centrifugal weights 24.

Figure 3:
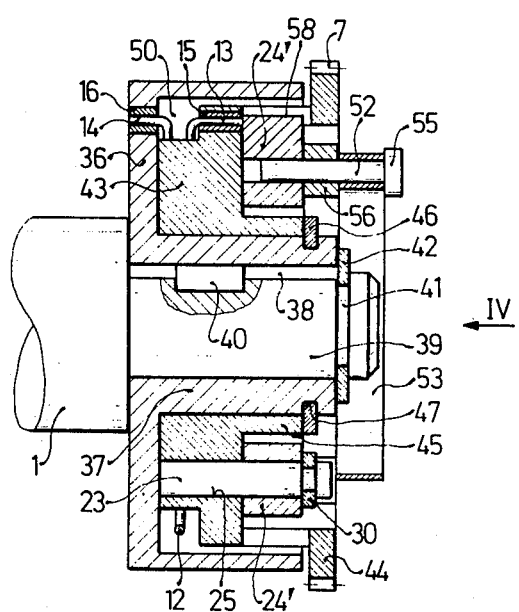
FIG. 3 is a pictorial side view, partly in section, of a rpm measuring apparatus according to a second exemplary embodiment of the invention having centrifugal weights which obtain their frictional coupling by contact with a bowl-shaped motion-sharing member.
Figure 4:
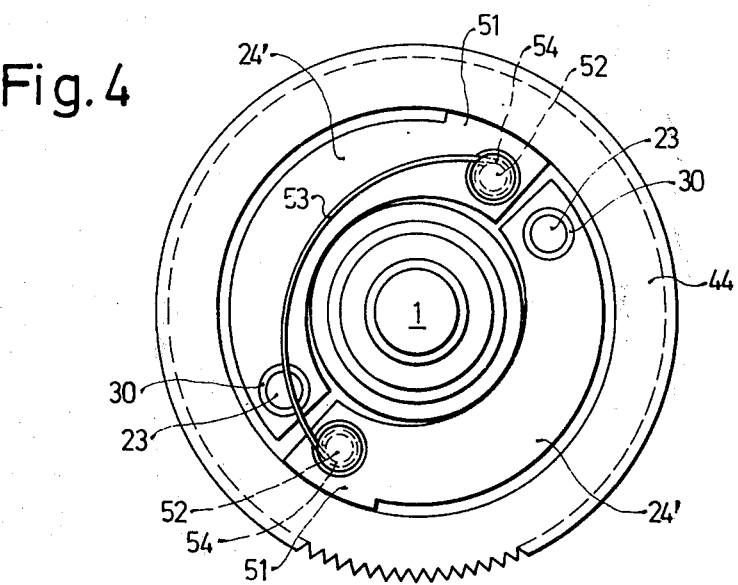
FIG. 4 is a top view of the exemplary embodiment shown in FIG. 3, the view being in the direction of the arrow IV.
Figure 5:
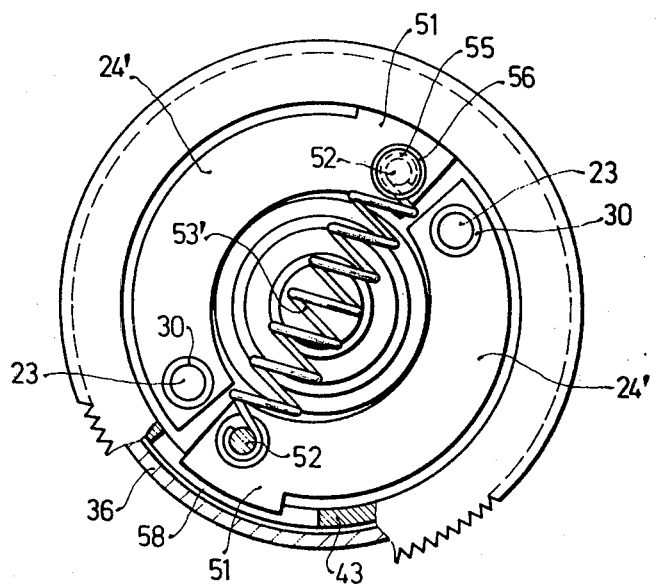
FIG. 5 is a top view of a modified exemplary embodiment of the embodiment of FIG. 3, the centrifugal weights being held together by a tension spring.

As illustrated in FIGS. 3 and 4 a second exemplary embodiment of a rpm measuring apparatus includes a cap-like motion-sharing member 36 which has a hub 37 and is mounted on a shaft portion 39 of reduced diameter of a drive shaft 1. The motion-sharing member 37 is connected to the shaft portion 39 by a fitted spring 40 which engages a longitudinal groove 38 in the shaft portion 39, thereby ensuring a rotational connection. In the axial direction, the cap-like motion-sharing member 36 is secured by a safety disc 42 riding in an annular groove 41 of the drive shaft portion 39. Bearing on the hub 37 is a bowl-shaped member 43 surrounded by the motion-sharing member 36. The bowl-shaped member 43 has a collar 44 extending over the motion-sharing member 36 in the radial direction, on the outer circumference of which are located teeth 7. The bowl-shaped member 43, serving as a toothed disc, has an interior hub 45 which, by means of its axial bore and together with hub 37, forms a sliding bearing. In the axial direction, the bowl-shaped member 43 is secured by a safety ring 46 riding in an outer annular groove 47 of the hub 37. Bent-over ends 13, 14 of a motion-transfer spring 12, embodied as a rotational spring as in the example of FIG. 1, are each located respectively in coaxial bores 15 and 16 which are at the same radial distance to the longitudinal axes of the bowl-shaped member 43 and the motion-sharing member 36. The spring 12 is placed in an annular space 50 which is formed between the inside of the bottom of the motion-sharing member 36 and the recessed bottom of the bowl-shaped member 43. In the same manner as in the exemplary embodiment of FIG. 1, semicircular centrifugal weights 24' are disposed symmetrically with respect to the drive shaft 1 on the inner bottom side of the bowl-shaped member 43 and are arcuately moveable in the rotational plane about bolts 23 fixedly and coaxially inserted in the bowl-shaped member 43. Each of the bolts 23 is placed in a respective bore 25 at two opposite ends of the centrifugal weights 24'. In the axial direction the centrifugal weights 24' are secured on the bolts 23 by safety discs 30. Ends 51 of the centrifugal weights 24' lying opposite the bores 25 are each reinforced with an enlarged outer diameter and possess a fastening pin 52 between which a tension spring 53 is placed diametrically. This tensioning spring can be, as shown in FIG. 3, a semi-circular leaf-spring 53 or a spiral tension spring 53', as shown in FIG. 5, having bent or curled ends 54 which surround the fastening pins 52. For securing the spring 53 or 53', the fastening pins 52 each have a head 55 and are pressed into coaxial bores of the centrifugal weights 24'. Spacer discs 56 are slid onto the pins 52 between the centrifugal weights 24' and the spring 53 or 53' for the axial guidance of these springs, as the case may be.

When the drive shaft 1 is not turning, the centrifugal weights 24' are pressed onto the hub 45 of the bowl-shaped member 43 by the force of the leaf spring 53. When the drive shaft 1 is turning and the rpm is increasing, the force of the leaf spring 53 is opposed by the centrifugal force acting on the centrifugal weights 24' and the more the rpm increases, the farther the centrifugal weights 24' are pivoted. The reinforced ends 51 of the centrifugal weights 24' can each move through a slot in the wall of the bowl-shaped member 43 and can come to rest on an inner wall surface of the cap-like, motion-sharing member 36. Thus, the relative motion of the inner bowl-shaped member 43 with respect to the cap-like motion-sharing member 36 fixedly connected with the drive shaft 1 is hindered by friction. At high rpm's, the centrifugal force overcomes the centripetal force of the leaf spring 53 in such a way that a rigid coupling occurs between the motion-sharing member 36 and bowl-shaped member 43. The damping produced by the motion-transfer spring 12 is completely eliminated at this time.

As desired, this rpm apparatus achieves a damping determined by the rotational motion-transfer spring 12 at low rpm and at high rpm, when the rpm variations must be rapidly transmitted to the regulator, damping is eliminated and is replaced by a rigid connection. FIG. 5, like FIG. 4, shows a top view of the exemplary embodiment according to FIG. 3 in which the diametrically disposed tension spring 53' is used instead of the leaf spring 53.

Figure 6:
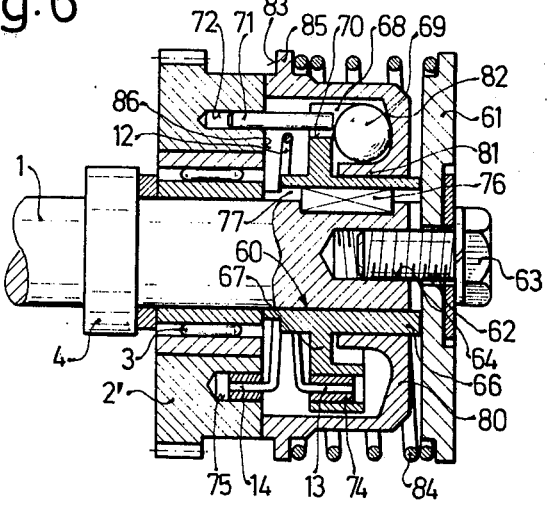
FIG. 6 is a fourth exemplary embodiment of a rpm measuring apparatus according to the invention with end face frictional coupling of a secondary member with a motion-sharing member which can be lifted off by centrifugal balls.

In another exemplary embodiment, illustrated in FIG. 6, there is just as in the exemplary embodiment of FIG. 1, a toothed disc 2' disposed on a needle bearing 3 on the drive shaft 1. The inner ring of the needle bearing 3 is adjacent at one side to a collar 4 on the drive shaft 1 and is pressed against it from the other side by a motion-sharing member 60 which, in turn, is held in the axial direction by a closure disc 61. The closure disc 61 has a central bore 62 penetrated by a safety screw 63 screwed into an axial threaded hole 64. The screw 63 pressed the closure disc 61 against the end of the drive shaft 1. The motion-sharing member 60 is embodied as a paddle wheel and it has a hub 66 with a disc-shaped bridge or web 67 at one side of which there are disposed paddle-shaped pockets 68 for carrying centrifugal balls 69 inserted therein. Furthermore, the disc-shaped bridge 67 has a clearance 70 at its outer circumference into which extends a limiting pin 71 pressed into a coaxial bore 72 of the toothed disc 2'. Furthermore, the disc-shaped bridge 67 has a coaxial bore 74 having the same distance from the axis as a coaxial bore 75 in the toothed disc 2'. Bent-over ends 13, 14 of a motion-transfer spring 12, embodied as a rotational spring, are placed in the two opposite bores 74 and 75. The motion-sharing member 60 is positively connected rotationally with the drive shaft 1 by a fitted spring 76 associated with the drive shaft 1 and engaging an inner longitudinal groove 77 of the hub 66 of the motion-sharing member 60.

A bowl-shaped body 80 is disposed on the hub 66 of the motion-sharing member 60 in such a way as to be coupled rotationally positive and axially slidable. This body 80 has a hub 81 and a bottom 82 inclined on the inside toward the hub 81, and it encloses the centrifugal balls 69. A face 83 of the body 80 is pressed onto an inner face 86 of toothed disc 2' by a pressure spring 84 which is tensioned between the closure disc 61 and a flange 85 at the outer circumference of the body 80. The positive rotational connection between the body 80 and the hub 66 of the motion-sharing member 60 can be realized by a splined shaft profile or by a groove and spring arrangement. When the drive shaft 1 is standing still, the toothed disc 2' is coonnected by frictional coupling at the faces 86, 83 with the member 80 and through this member and through the motion-sharing member 60 to the drive shaft 1. The rotational motion of the drive shaft 1 causes the centrifugal balls 69 to be acted upon by centrifugal forces and they therefore have the tendency to move radially outward. While moving outward, they are pressed against the inclined bottom 82 of the body 80 and produce an axial displacement of this body in opposition to the force of the pressure spring 84 as soon as the centrifugal force is large enough, depending on the rpm. In this way, the contact pressure on the end face and, consequently, the braking torque produced by the frictional forces is reduced with increasing rpm and, beginning with a certain rpm determined by the mass of the balls 69 and by the characteristics of the spring 84, the braking torque is entirely relieved. At low rpm, as long as the frictional coupling is maintained, any rotational oscillations or vibrations introduced by the drive shaft 1 are transmitted to the toothed disc 2' only after being damped. When the frictional contact is relieved, the damping of such rotational oscillations or vibrations occurs only because of bearing friction, for example, that of the needle bearing 3 and by means of the rotational, motion-transfer spring 12 placed between the toothed disc 2' and the motion-sharing member 60. Appropriate sizing of the motion-transfer spring 12 can determine the desired remaining damping at these high rpm's.

Of course, in the arrangement shown in FIG. 6, as well as that of FIG. 1, it is possible to use another roller bearing instead of the needle bearing 3 or to use a sliding bearing. The relative motion of the toothed disc 2' with respect to the drive shaft 1 is limited, just as in the example of FIG. 1, by the length of the clearance 70 in which the limiting pin 71 moves. In this way, a transmission of the rotational motion onto the toothed disc 2' is guaranteed even of the motion-transfer spring 12 should fail.

It is, of course, also possible to provide, for example, a mechanical centrifugal regulator of known construction as the rpm signal generator instead of the toothed disc 2 or 2' on the damped side of the rpm oscillation damper. The rpm-dependent regulatory motion of the centrifugal regulator, in that case, can be transmitted directly to the control location or a known servo device could be used.

Furthermore, a magnetic tape can be provided for producing a pulsating rpm signal, which tape would be disposed around the outermost circumference of the secondary member in place of the teeth.

It is to be appreciated that the foregoing descriptions and accompanying illustrations have been given by way of examples. Numerous variants and other embodiments are possible without departing from the spirit and scope of the invention as defined in the appended claims.

What is claimed is:

1. In a rpm measuring apparatus having a rpm signal generator driven by a drive shaft, the improvement comprising an oscillation damper having a rpm-dependent damping characteristic driven by said drive shaft, said damper including two centrifugal weights and at least one spring operatively associated with the centrifugal weights for effecting frictional contact between said drive shaft and the centrifugal weights at low shaft rpm, said signal generator being disposed on said damper.

2. An arrangement according to claim 1 including a fixed yoke carrying an induction coil and having a toothed portion, and wherein said rpm signal generator comprises a toothed disc which, together with said fixed yoke carrying said induction coil has said toothed portion lying opposite said toothed disc and forms therewith a magnetic circuit.

3. An arrangement according to claim 1 including a fixed yoke carrying an induction coil, and wherein said rpm signal generator comprises a magnetic tape means disposed, for the induction of a pulsating rpm signal, on an outer circumference of a damped portion of said oscillation damper and opposite said fixed yoke carrying said induction coil, said magnetic tape means forming a magnetic circuit together with said yoke.

4. An arrangement according to claim 1, wherein said rpm signal generator comprises a mechanical centrifugal weight regulator.

5. An arrangement according to claim 1, including a motion-sharing member and a limiting pin connected to said secondary damped part, and wherein said secondary damped part is coupled to said motion-sharing member fixedly connected to said drive shaft, wherein said motion-sharing member is provided with a groove means, wherein said motion transfer spring is a spiral spring, and wherein the magnitude of arcuate movement of said secondary damped part on said drive shaft is determined by the length of said groove means in said motion-sharing member into which groove means said pin protrudes.

6. An arrangement according to claim 5, including at least one spring, two centrifugal weights disposed on said secondary member, said centrifugal weights being point-symmetrically placed with respect to said drive shaft, being arcuately movable in the rotational plane of said secondary member, each about a fixed axis, and being biased by force of said at least one spring in the direction toward said drive shaft and which, in the position in which they are not pivoted by centrifugal force, maintain frictional contact between said secondary member and said drive shaft.

7. An arrangement according to claim 6, including a collar on a face of said secondary member and a pressure spring which acts in the rotational plane of said centrifugal weights, said pressure spring being tensioned between each said centrifugal weight and said collar.

8. An arrangement according to claim 6, wherein said pressure spring is fastened at its respective two ends to ends of said centrifugal weights lying farthest from respective fixed axes about which these centrifugal weights may respectively move.

9. An arrangement according to claim 6, including a first bearing hub, and wherein said secondary damped part is coupled by said motion-transfer spring embodied as a spiral spring to said motion-sharing member embodied as a cap-shaped member, said cap-shaped member being rigidly connected to said drive shaft via said hub, said two centrifugal weights being disposed in point symmetry with respect to said drive shaft and being arcuately movable about respective fixed axes lying in the rotational plane of said secondary damped part, being actuable by force of said at least one additional spring in the direction of said drive shaft and which is in position of excursion due to centrifugal force experience friction coupling with an inner surface of said cap-shaped member.

10. An arrangement according to claim 9, wherein said signal generator includes a second bearing hub, said secondary damped member is embodied as a bowl-shaped member having a collar extending over said motion-sharing member in the radial direction, said second bearing hub resting on said second bearing hub and forming therewith a radial sliding bearing, said bowl-shaped member defining spaces for the accommodation of said centrifugal weights towards an inner wall surface of said motion-sharing member.

11. An arrangement according to claim 10, wherein each of said centrifugal weights is pivotable against the force of a pressure spring tensioned between said centrifugal weights and a wall of the said cap-shaped member.

12. An arrangement according to claim 10, including a tension spring, and wherein ends of said centrifugal weights farthest removed from a fixed axis are acted upon by the force of said tension spring acting in the direction of said drive shaft.

13. An arrangement according to claim 5, wherein said motion-sharing member is provided with lateral pockets for supplementing motion of said centrifugal weights embodied as centrifugal weight balls, and further including a bearing hub on which a bowl-shaped body surrounding said balls is mounted, said hub being slidable in an axial direction, said bowl-shaped body having a bottom inclined obliquely toward the inside, with a guide member; further including spring means for pressing a face of said bowl-shaped member against a face of said secondary damping member for the formation of friction coupling, said spring means being supported on a flange on the circumference of said bowl-shaped member; and a disc means screwed onto said drive shaft at its front end, whereby whenever the balls are not moved outwardly by the effect of centrifugal force and against the force of the spring means, the front end of the bowl-shaped body is lifted from the face of the secondary damping member.

14. An arrangement according to claim 15, wherein said rpm signal generator is embodied as a mechanical centrifugal governor.

15. In an rpm measuring apparatus having a rpm signal generator driven by a drive shaft, the improvement comprising an oscillation damper having a rpm-dependent damping characteristic driven by said drive shaft, said signal generator being disposed on said damper, a motion transfer spring, two centrifugal weights and at least one additional spring, wherein said oscillation damper includes a secondary damped part, said part being fixed rotatably on said drive shaft and connected to said drive shaft by a motion transfer spring for transmitting rotation of said drive shaft, said at least one additional spring being operatively associated with said centrifugal weights for effecting friction contact between said drive shaft and said damped part at low rpm and for effecting elimination of the frictional contact at high rpm as a result of the centrifugal weights swinging apart.

* * * * *